July 12, 1960 D. REVERDIN 2,945,194

TRANSMITTER-RECEIVER SWITCHES

Filed April 25, 1956 3 Sheets-Sheet 1

United States Patent Office 2,945,194

Patented July 12, 1960

2,945,194

TRANSMITTER-RECEIVER SWITCHES

Daniel Reverdin, Paris, France, assignor to Compagnie Generale de Telegraphie Sans Fil, a corporation of France Filed Apr. 25, 1956, Ser. No. 580,660

Claims priority, application France May 9, 1955

6 Claims. (Cl. 333—10)

The present invention relates to ultra high frequency pulse switch systems.

In conventional pulse transmitting and receiving devices comprising a single aerial for both transmission and reception, it is necessary to provide switching means for isolating the receiver from the aerial when the transmitter is in operation and for isolating the latter from the aerial when the transmitter is at rest. These two functions are generally performed by two separate devices, known as TR and anti-TR switches, usually inserted by means of T junctions, in the guide connecting the transmitter to the aerial. Moreover, known switches of this type are frequently of a complicated design and structure, are ill adapted to transmission of high powers and have a rather narrow pass-band.

The device according to the invention essentially comprises two superimposed air filled guides juxtaposed to two gas-filled guides; the two air filled guides are respectively coupled by one of their ends to the transmitter and to the aerial, their other ends being closed; the ends of the gas-filled guides are closed, except one, which is coupled to the receiver. The energy applied by the transmitter is equally distributed between the two air filled guides by means of a 3 db hybrid junction and regrouped by means of a second hybrid junction of the same type. The two gas-filled guides are also mutually coupled trough a 3 db hybrid junction. Finally, a total directional-coupler, formed by a window closed by a dielectric sheet, is formed in the wall common to a gas-filled guide and to an air-filled guide.

The operation of the device according to the invention will be better understood from the ensuing description and the appended drawings, wherein the gas-filled volumes are indicated by spaced line hatching.

In this drawing.

Same references are used throughout all the figures of the drawings to identify identical elements.

Figure 1:
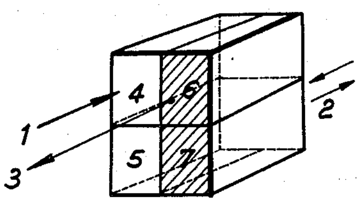
Fig. 1 shows an intermediate portion of the device according to the invention limited by two planes perpendicular to the longitudinal axis thereof.
Figures 2, 3, 4:
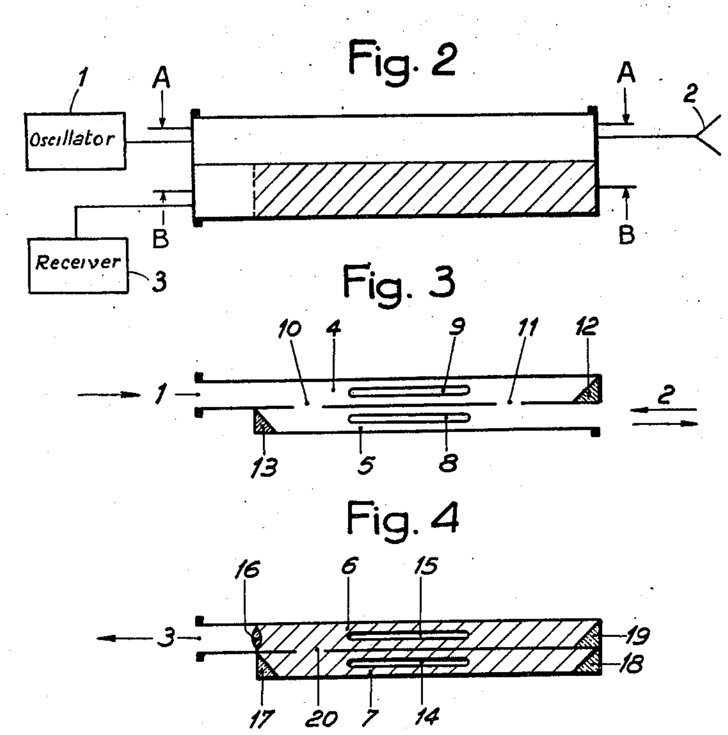
Fig. 2 is a plan view of the device of Fig. 1.
Figs. 3 and 4 are sectional views, at a reduced scale, along lines A—A and B—B, respectively, of Fig. 2.
Figures 3A, 4A:
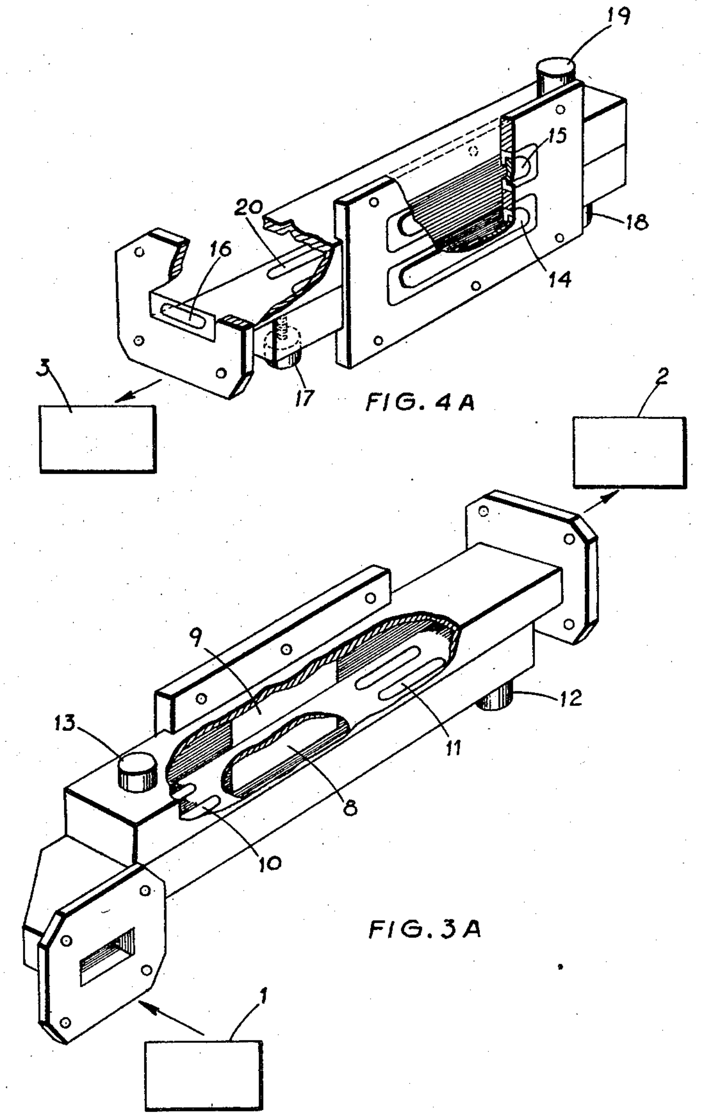
Figs. 3A and 4A are isometric views of the embodiments of Figs. 3 and 4, respectively.

According to the embodiment illustrated in Figs. 1 to 4, the device according to the invention is built up by four identical guide sections 4, 5, 6 and 7, juxtaposed by pairs, as shown in Fig. 1.

Guides 4 and 5 are air-filled and guides 6 and 7 are filled with a readily ionizable low-pressure gas, for instance a mixture of argon and water vapour.

In operation one end of the guide 4 is connected, by suitable energy transfer means, to a pulse-modulated generator 1 and guide 5 is coupled, by suitable energy transfer means at its opposite end, to a transmission-reception aerial 2. These two guides are superimposed along one of their small walls. This wall is provided with two openings 10 and 11, dimensioned to form 3 db hybrid junctions. Further, two windows 8 and 9 are cut out, repectively, in their broad walls directed inwardly of the device. The free ends are closed on absorber loads 12 and 13 respectively.

A 3 db hybrid junction 20 is formed in the small wall common to guides 6 and 7 and two windows 14 and 15, closed by a dielectric sheet and forming a total directional coupler, are cut in their walls, facing respectively the walls where windows 8 and 9 are cut and in registry with the latter.

A resonant window 16, closed by dielectric material, is located at the end of guide 6 directed towards, and coupled by suitable energy transfer means to, a receiver 3. The other ends of the gas filled guides 6 and 7 are closed on absorber loads 17, 18, 19 respectively.

The device described operates as follows:

When an incoming pulse from generator 1 enters guide 4, the energy divides at the level of junction 10 into two equal parts with, as is well known, a phase shift of 90° in guide 5. The small energy fraction which might propagate towards load 13 is absorbed by the latter.

The pulse energy propagating in the guides 4 and 5 reaches then windows 14 and 15 and a discharge occurs in the gas contained in guides 6 and 7, resulting in the production of a conducting ionized gas screen in front of these windows. From the propagation view-point, this is tantamount to suppression of windows 14 and 15, since the whole of the walls of guides 4 and 5 appears as substantially continuous.

The small fraction of energy, which might cross windows 14 and 15, is absorbed by loads 18 and 19.

At the level of the second 3 db hybrid junction 11 energy is redistributed and it will be readily appreciated that propagation beyond the junction occurs only in guide 5. The small energy portion which might propagate further in guide 4 is absorbed by load 12.

When reception takes place, the echo energy entering guide 5 is distributed, in the same way as above, between guides 4 and 5 across hybrid junction 11, but is too low to set up the ionization of the gas and will therefore pass into guides 6 and 7 through total directional couplers 14 and 15.

Under these conditions, the whole of the echo energy is coupled through hybrid junction 20 and the resonant window 16 to receiver 3.

All the elements used having a wide pass band, the system is suitably used over a wide frequency range.

Another advantage is that, by distributing the energy between the two guides 4 and 5, any risk of breakdown of windows 14 and 15 is avoided, even though considerable energy may be used. Finally, the two gas-filled guides 6 and 7 actually form a single gas filled envelope. The gas therefore behaves in a similar way in both guides, contrary to what might happen if two devices, using separate guides, were used.

Of course any two adjacent walls may as well be merged into one single common wall.

According to a further embodiment of the invention the relative arrangement of the guides is reversed in such a way that the apertures, which in the previous embodiment were provided in the small walls, are now cut in the same way in the broad walls, and vice versa.

Figure 5:
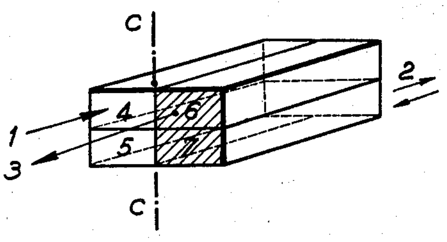
Fig. 5 shows a portion of another arrangement of the guides used in the system of the invention.

The structure thus obtained is represented schematically, in perspective view, in Fig. 5. The device operates in a similar way as in the case of Figs. 1 to 4.

Figure 6:
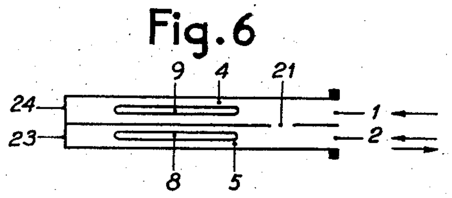
Figs. 6 and 7 are sectional views, similar to Figs. 3 and 4 respectively, of a modified embodiment of the device according to the invention.
Figure 7:
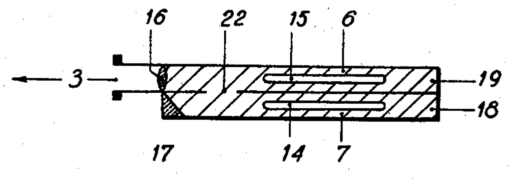

Another embodiment of the invention is illustrated schematically in Figs. 6 and 7. Same guides are used as in Figs. 1–4, but the coupling is somewhat different. The two hybrid junctions 10 and 11 are replaced by a single hybrid junction 21 and loads 12 and 13 by short-circuits 23 and 24. Generator 1 and aerial 2 are coupled at the same end of the device, which may, in certain cases have a practical interest.

The device operates as follows:

The energy from the generator 1 is divided into two equal portions by hybrid junction 21. Windows 14 and 15 are then ionized, as in the case of Figs. 1–4. Energy propagated beyond hybrid junction 21 is reflected by short-circuits 23 and 24 and returns to hybrid junction 21. For the remainder, the operation is similar to the operation of the aforedescribed embodiment.

This modified embodiment has a simplified structure but the power which may be transmitted is reduced.

According to a further modification instead of using four guides 4 to 7, an even number of groups of four guides may be employed.

Figure 8:
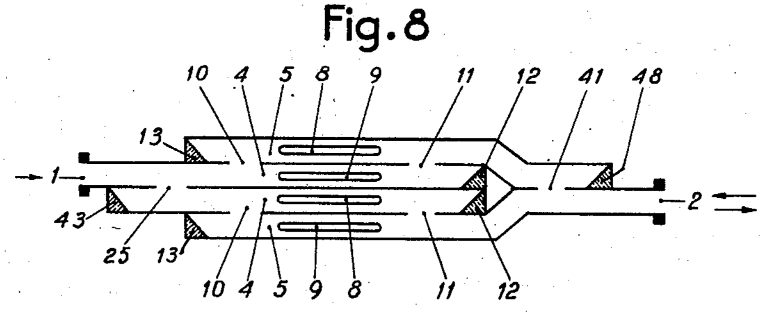
Figs. 8 and 9 are sectional views, similar to Figs. 3 and 4 respectively, illustrating another modification of the same device.
Figure 9:
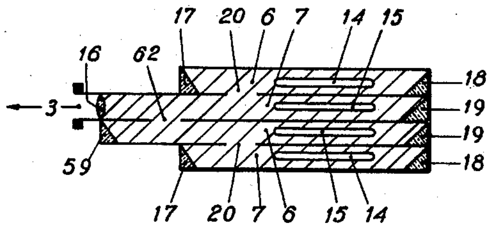

The device in Figs. 8 and 9 is a combination of the two devices shown in Figs. 1–4. The only difference consists in that, both at the generator and at the aerial end, the energy is divided into two parts, then regrouped, by means of hybrid junctions 25 and 41, respectively. Also, hybrid junction 62 is provided at the input of the receiver, as illustrated in Fig. 9, to regroup the echo energy.

Absorbing loads 43, 48 and 59 are located in the neighborhood of hybrid junctions 25, 41, and 62, respectively, so as to absorb the small portion of the energy which might be propagated beyond these junctions, in a direction different from the one desired.

It would also be possible to combine, as has been done in the case of Figs. 8 and 9, any even number $n$ of devices according to the invention, to form a single switch, instead of combining only two of them as has been done in the case of these two figures, the combined devices being either of the type shown in Figs. 1 to 4 or in Figs. 6 and 7. It would be sufficient to distribute the energy, by means of successive 3 db hybrid junctions, first between two groups of $n/2$ systems, according to Figs. 1 to 4, or 6 and 7, then within each such group between two sub-groups of $n/4$ such systems etc., until the energy incoming from a single transmitter, or aerial, is finally distributed between the $n$ systems. In regrouping of the energy for feeding a single receiver, or aerial, the process is reversed, exactly as is done in connection with Figs. 8 and 9.

It is apparent that the system according to the invention performs the functions both of the TR and ATR devices, thus, making it possible to use a single device where two different devices are usually employed.

What I claim is:

1. An ultra high frequency transmitter-receiver switch comprising: two identical air filled wave guides, having a common wall, said guides each having one end closed and the other open for respective connection to a pulse modulated transmitter and to an aerial; two wave guides filled with ionizable gas having a common wall portion, one of said gas filled guides having at one end means for transferring energy to a receiver; said air filled and gas filled guides having other common walls adjacent to each other, and respective total directional couplers in said common walls; a dielectric material closing said couplers; said air filled guides having a three decibel hybrid junction positioned between each open end and said total directional couplers; and said gas filled guides having a three decibel hybrid junction between said total directional couplers and said energy transferring means.

2. An ultra high frequency transmitter-receiver switch comprising: two identical air filled wave guides, having similar respective walls adjacent to each other, said guides each having one end closed and the other open for respective connection to a pulse modulated transmitter and to an aerial, said respective open ends facing opposite directions; two gas filled wave guides having respective similar walls adjacent to each other, one of said gas filled guides having at the end opposed to the aerial a window for connection to a receiver; said air filled and gas filled guides having other respective walls adjacent to each other every two adjacent walls having between them a total directional coupler; a dielectric sheet closing said couplers; said air filled guides having a three decibel hybrid junction between each open end and said total directional couplers; and said gas filled guides having a three decibel bybrid junction between said total directional coupler and said window for connection to a receiver.

3. A switch according to claim 2 further comprising absorbing loads positioned at said closed ends.

4. An ultra high frequency transmitter-receiver switch comprising; two identical air filled wave guides, having similar respective walls adjacent to each other, said guides having their respective ends facing one direction closed and their respective ends facing the other direction open for respective connection to a pulse modulated transmitter and to an aerial; two gas filled wave guides having respective similar walls adjacent to each other; one of said gas filled guides having one end closed, the other end having a connection window for connection to a receiver; said air filled and gas filled guides having other respective walls adjacent to each other, the adjacent guide walls having between them respective total directional couplers; a dielectric sheet closing said couplers; said air filled guides having a three decibel hybrid junction between their respective open ends and said total directional couplers; and said gas filled guides having a three decibel hybrid junction between said total directional coupler and said connection window.

5. An ultra high frequency transmitter-receiver switch comprising $n$ systems, each comprising two identical air filled wave guides, having similar respective walls adjacent to each other, said guides each having one end closed and the other open; two gas filled wave guides having respective similar walls adjacent to each other, said gas filled guides having all one end open; said air filled and gas filled guides having other respective walls adjacent to each other, and a total directional coupler between adjacent walls; a dielectric material closing said couplers; said air filled guides having a three decibel hybrid junction between each open end and said total directional couplers; said gas filled guides having a three decibel hybrid junction between said total directional couplers and said open end, and three groups of $n$–1 further three decibel hybrid junctions, each having three ends open and one end closed, for respective parallel connection of said $n$ systems by their respective open ends to a transmitter, to an aerial and to a receiver, by groups of two systems, parallel connected by a three decibel hybrid junction.

6. An ultra high frequency transmitter-receiver switch comprising a plurality of parallel hollow wave guides arranged in pairs, the two guides of a pair being filled with a same gas and of same length, a first group of pairs being filled with air and a second with ionizable gas; one air-filled guide having one end closed and the other end open for connection to a transmitter, another air-filled guide having one end closed and the other end open for connection to an aerial, one ionizable gas-filled guide having one end closed and the other end gas-sealed and open for connection to a receiver, all the other ends of said guides being closed; three decibel hybrid junctions between the two guides of each pair adjacent each open end thereof, and a total directional coupler having dielectric material for closing the same, between adjacent pairs of guides, intermediate the ends thereof.

References Cited in the file of this patent

UNITED STATES PATENTS

| | | |
|---|---|---|
| 2,586,993 | Riblet | Feb. 26, 1952 |
| 2,627,573 | Riblet | Feb. 3, 1953 |
| 2,748,351 | Varnerin | May 29, 1956 |